United States Patent [19]
Grace

[11] Patent Number: 6,098,665
[45] Date of Patent: Aug. 8, 2000

[54] METHOD AND APPARATUS FOR LINING A CONDUIT

[75] Inventor: John Grace, Prestbury, United Kingdom

[73] Assignee: North West Water Limited, United Kingdom

[21] Appl. No.: 09/068,180

[22] PCT Filed: Sep. 5, 1997

[86] PCT No.: PCT/GB97/02391

§ 371 Date: Feb. 10, 1999

§ 102(e) Date: Feb. 10, 1999

[87] PCT Pub. No.: WO98/09797

PCT Pub. Date: Mar. 12, 1998

[30] Foreign Application Priority Data

Sep. 5, 1996 [GB] United Kingdom .................. 9618516

[51] Int. Cl.[7] .................................................. F16L 55/16
[52] U.S. Cl. ........................... 138/98; 138/97; 264/36.16; 405/184
[58] Field of Search ....................... 138/97, 98; 156/289, 156/293; 264/36.16, 269, 516; 405/156, 184

[56] References Cited

U.S. PATENT DOCUMENTS

| | | | |
|---|---|---|---|
| 4,207,130 | 6/1980 | Barber ....................................... | 138/97 |
| 4,347,018 | 8/1982 | Wrightson et al. ....................... | 138/97 |
| 5,042,532 | 8/1991 | Gilleland ................................... | 138/97 |
| 5,285,817 | 2/1994 | Sigel ......................................... | 138/97 |
| 5,335,872 | 8/1994 | Clubbs ..................................... | 138/98 |
| 5,395,472 | 3/1995 | Mandich .................................. | 138/97 |
| 5,447,665 | 9/1995 | Steketee, Jr. ............................. | 138/97 |

FOREIGN PATENT DOCUMENTS

| | | |
|---|---|---|
| 0 098 547 A1 | 1/1984 | European Pat. Off. . |
| 0 377 486 A2 | 7/1990 | European Pat. Off. . |
| 0 514 142 A2 | 11/1992 | European Pat. Off. . |
| 1 580 438 | 12/1980 | United Kingdom . |
| 2 218 490 | 11/1989 | United Kingdom . |
| 2 255 813 | 11/1992 | United Kingdom . |
| WO 96/37725 | 11/1996 | WIPO . |

*Primary Examiner*—James Hook
*Attorney, Agent, or Firm*—Michael Best & Friedrich LLP

[57] ABSTRACT

A method for lining a conduit with a deformable plastics liner pipe, the claimed method including deforming the liner along its length to a cross-section with reduced external dimensions relative To the dimensions of the undeformed liner and binding the liner by helically winding an elongate flexible element around the liner along its length to maintain it in the deformed cross-section. The method further includes drawing the bound liner into the conduit to be lined and releasing the binding to allow the liner to assume a cross-section substantially corresponding with the internal cross-section of the conduit. The elongate flexible element is supplied to the liner from a bobbin or the like through which the liner is passed in the deformed cross-section, the bobbin or the like being mounted for rotation around the liner as it passes therethrough to wind the elongate flexible element around the liner.

16 Claims, 17 Drawing Sheets

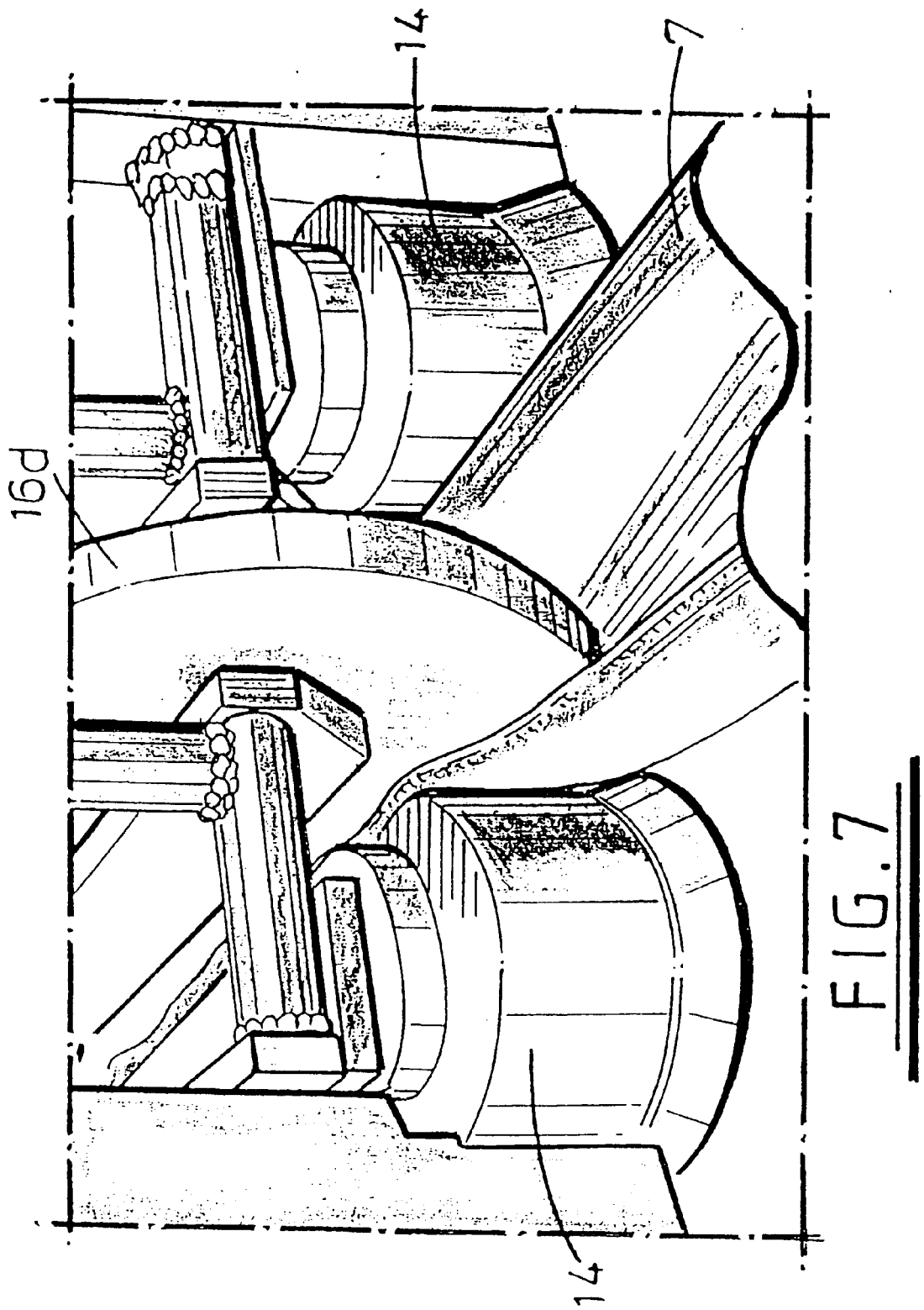

METHOD AND APPARATUS FOR LINING A CONDUIT

The present invention relates to methods and apparatus for lining a conduit. Particularly, but not exclusively, the invention relates to the relining of pipework such as underground water mains.

There are a number of known techniques for rehabilitating, rather than replacing, existing underground pipework; Traditional methods which are still widely employed involve spray coating the inner surface of a pipe with a suitable material such as epoxy resin. It is also known to reline pipework with a plastics liner pipe (typically polyethylene), which is drawn into the existing pipe. This method is referred to as "slip lining".

In known "close fit" slip lining processes, the cross section of the plastics liner is first reduced to enable it to be drawn into the existing pipe. Once in position, the liner can be expanded to a circular cross section. A number of different methods and apparatus have been proposed for each of the three basic steps of this process, i.e. deforming the liner into a reduced cross-sectional shape, maintaining the liner in the reduced cross-sectional shape whilst it is drawn into the existing pipe, and expanding the liner into a circular cross-section once it is in place.

For instance, British patent specification number 1 580 438 describes a process, in which a plastics liner is first deformed into a reduced cross-sectional form, and then wrapped in a sleeve to bold it in this form as it is drawn into a pipe. The sleeve is provided with a tear line or fuse to enable rupturing of the sleeve once the liner has been installed in the pipe to allow the liner to assume a circular cross-section. It is also suggested in this patent specification that other means might be used to hold the liner in the deformed cross-section, including coiling a filament around the liner or restraining it using spaced apart bands or tape. It is suggested that such binding can be released once the liner has been inserted into the pipe by passing a cutting means through the pipe to slice through the binding.

An object of the present invention is to provide new methods and apparatus for lining existing pipework.

According to one aspect of the present invention there is provided a method for lining a conduit with a deformable plastics liner pipe, the method comprising,
 (i) deforming the liner along its length to a cross-section with reduced external dimensions relative to the dimensions of the un-deformed liner,
 (ii) binding the liner along its length to maintain it in said deformed cross-section;
 (iii) drawing the bound liner into the conduit to be lined; and
 (iv) releasing the binding to allow the liner to assume a cross-section substantially corresponding with the internal cross-section of the conduit;,
wherein the liner is fabricated from a plastics material and has a wall thickness in the range of about 1.5 mm to 5 mm.

The plastics material is preferably a polymeric material such as, for example, polyethylene.

Preferably the liner has a wall thickness of between 2mm and 4 mm, and more preferably still between about 2.5 mm and 3.5 mm.

The liner for lining a given conduit preferably has an initial circumference smaller than the internal circumference of the conduit, the liner being expanded beyond its initial circumference into contact with the conduit by internal fluid pressure.

Preferably the liner is deformed into a generally U-shaped or horse-shoe shaped cross-section.

The liner may be bound in said deformed cross-section by hooped restraining straps which are positioned at spaced apart locations along the length of the liner.

For instance the straps may be fabricated from a plastics material and may be approximately 0.5 mm thick and between 5 and 15 mm wide.

Alternatively the liner may be bound in said deformed cross-section by helically winding an elongate flexible element around the liner along its length.

For instance said elongate flexible element may be a self adhesive tape. Suitable tapes are readily available. Preferably the adhesive should be one that is entirely solvent free as recommended by liner polymer manufacturers to be in contact with the liner.

Preferably the liner, is mechanically deformed by means comprising at least one pair of rollers disposed on opposite sides of the liner and a mechanical former which depresses the liner into a generally U-shaped cross-section between said rollers.

According to a second aspect of the present invention there is provided a method for lining a conduit with a deformable plastics liner pipe, the method comprising;
 (i) deforming the liner along its length to a cross-section with reduced external dimensions relative to the dimensions of the un-deformed liner,
 (ii) binding the liner along its length with hooped restraining straps to maintain it in said deformed cross-section;
 (iii) drawing the bound liner into the conduit to be lined;
 (iv) releasing the binding to allow the liner to assume a cross-section substantially corresponding with the internal cross-section of the conduit;
wherein said straps are transferred to the liner from a magazine tube around which the straps are initially located and through which the liner is passed subsequent to its deformation, the magazine tube being sized to maintain die liner in said deformed cross-section as it passes therethrough, and restraining straps are successively cast off the magazine tube onto the liner as it exits the magazine tube at the necessary frequency to attain the desired strap spacing.

According to a third aspect of the present invention there is provided a method for lining a conduit with a deformable plastics liner pipe, the method comprising;
 (i) deforming the liner along its length to a cross-section with reduced external dimensions relative to the dimensions of the un-deformed liner,
 (ii) binding the liner by helically winding an elongate flexible element around the liner along its length to maintain it in said deformed cross-section;,
 (iii) drawing the bound liner into the conduit to be lined;
 (iv) releasing the binding to allow the liner to assume a cross-section substantially corresponding with the internal cross-section of the conduit,
wherein the elongate flexible element Is supplied to the liner from bobbin or the like through which the liner is passed in said deformed cross-section, the bobbin or the like being mounted for rotation around the liner as it passes therethrough to wind the elongate flexible element around the liner.

According to a fourth aspect of the present invention there is provided a method for lining a conduit with a deformable plastics liner pipe, the method comprising;
 (i) deforming the liner along its length to a cross-section with reduced external dimensions relative to the dimensions of the un-deformed liner,
 (ii) binding the liner by helically winding an elongate flexible element around the liner along its length to maintain it in said deformed cross-section;

(iii) drawing the bound liner into the conduit to be lined;

(iv) releasing the binding to allow the liner to assume a cross-section substantially corresponding with the internal cross-section of the conduit.

wherein the elongate flexible element is a self adhesive tape.

According to a fifth aspect of the present invention there is provided apparatus for binding in elongate member, such as a liner used in lining a pipeline or, other conduit, the apparatus comprising a plurality of hooped binding straps pre-mounted around the circumference of a magazine tube for receiving the elongate member therethrough, whereby successive binding straps can be slid from the magazine tube on to the elongate member at desired spaced apart locations as the elongate member passes through the magazine tube.

According to a sixth aspect of the present invention there is provided apparatus for binding an elongate member, such as a liner used in lining a pipeline or other conduit, the apparatus comprising a tube through which the member is passed means for dispensing an elongate flexible element mounted co-axially about said tube for rotation about the axis of said tube as the elongate member passes therethrough, such that once the leading end of the flexible element is secured to the surface of the elongate member the flexible element can be helically wound around the elongate member as it travels through and exits the tube by rotation of the dispensing means around the tube.

Because the dispensing means (which may be a bobbin or similar "coiled" source) is co-axial with the tube (as oppose to, say, being mounted so as to rotate around the tube in a "planetary" fashion), the external dimensions of the apparatus can be minimised. The is particularly advantageous in, for instance, applications in which the apparatus forms part of a pipe (or similar conduit) lining apparatus where an excavation has to be dug to accommodate the apparatus, by enabling the size of the excavation to be similarly minimised.

Specific embodiments of the present invention will now be described, by way of example only, with reference to the accompanying drawings, in which:

FIGS. 3 to 7 illustrate features and operation of a first part of the apparatus of FIG. 2;

An appropriate liner may be fabricated from polyethylene, preferably MDPE (although HDPE may, for instance, also be suitable). Such a liner may be manufactured in a continuous length with a substantially circular cross section, by a process of hot melt extrusion. The high temperature of the extrusion process will ensure that the liner is initially sterile (by accepted industry standards). If required, the ends of the liner may be welded closed to prevent contamination during subsequent transport and installation in a pipe line. A vent valve should also be provided at one end of the liner to allow air to be expelled from the liner as it is deformed to a reduced cross-section for installation in a pipeline (and to allow air to be "sucked" in on subsequent expansion of the cross-section) as described below.

The liner is produced with a wall thickness appropriate to the diameter of the liner. That is, larger diameter liners may require a thicker wall to provide the required hoop strength. Preferably, however, the liner should be relatively thin, typically having a wall thickness between 2.5 mm and 3.5 mm.

Subsequent to manufacture, the liner can be coiled, as a single length appropriate to any given installation requirement, around a reel (with the vented end of the liner innermost) which is preferably single width. For compact transport it is preferable that the liner is coiled in a "semi-layflat" configuration. This also increases ease of handling and of subsequent deformation of the liner. The liner may then be transported to the site of the host pipe to be lined.

Figure 1:
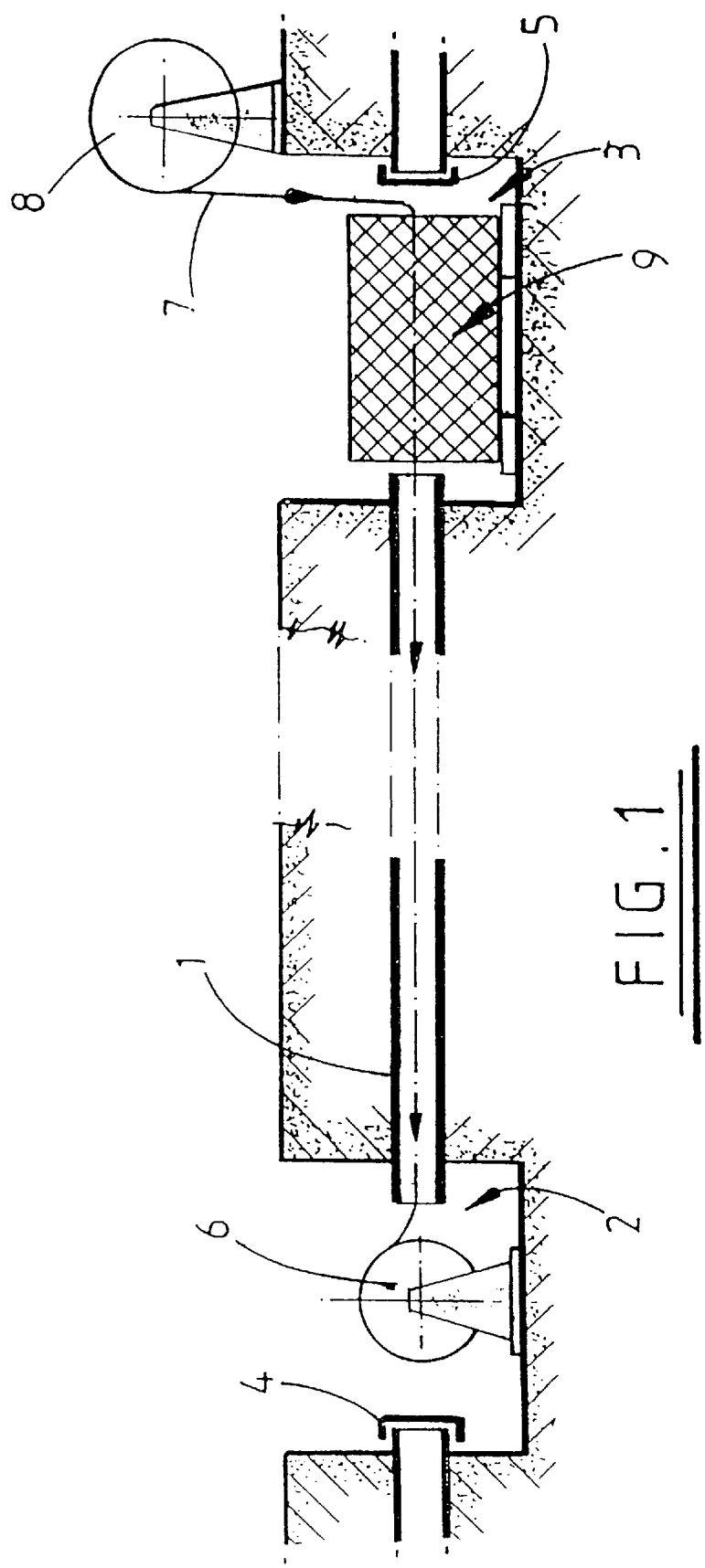
FIG. 1 is a schematic illustration of a pipe installation process in accordance with the present invention.

On site, ends of the section of host pipe to be lined are exposed by excavation and the pipe is prepared using conventional cleaning and encrustation removal techniques. FIG. 1 is a simple schematic illustration of a typical arrangement the section of host pipe to be lined being designated by the reference 1. Excavations 2 and 3 are made at each end of the host pipe section 1 and short sections of pipe are, removed to create necessary space for location of the installation apparatus. Ends of the pipeline not currently being lined are "capped" in accordance with conventional techniques (this is indicated by the references 4 and 5)

A winch 6 is situated in one excavation 2 at one end of the pipe section 1 for drawing the liner 7 into the pipe 1 from the excavation 3 at the opposite end of the pipe 1. In order to minimise disruption by keeping the size of the excavation 3 to a mininum, the reel 8 carrying the liner 7 is preferably mounted at ground level as shown. Liner installation apparatus in accordance with the present invention is then mounted within the excavation 3 as schematically represented by the reference 9. The liner 7 is then connected to the winch cable and drawn from the reel 8 into the excavation through the installation apparatus 9, and into the pipe section 1.

Rather than mount the reel 8 at ground level, the reel 8 could be situated within a van used to transport the liner (which may preferably be heated to increase malleability of the liner). In addition, a supporting frame (not shown) may be provided to support the liner as it travels from the reel 8 to the installation apparatus 9. For instance, a preferred support frame may include a light weight thin wall telescopic tube, for instance of rectangular section, through which the liner passes between the reel 8 and the installation apparatus 9. This would not only support and help guide the liner but would also provide weather protection so that the liner is clean and dry when it reaches tho installation apparatus 9. The telescopic tube could be fitted with a clear window (e.g. perspex) to allow observation of the passage of the liner therethrough.

As a further alternative to the described arrangement, the reel 8 could be situated on the opposite side of the excavation 3 to that shown in FIG. 1, so that the liner passes from the top of the reel, over the top of the installation apparatus 9 (from front to back) before entering the excavation at the back of the installation apparatus 9. This would mean that bending of the liner as it passes to the installation apparatus 9 is always in the same direction as the direction in which the liner is coiled around the reel 8.

The installation apparatus comprises means for deforming the liner into a reduced cross-sectional configuration and means for binding the liner to maintain it in that deformed cross-section as it is drawn into the pipe 1. This apparatus is described in more detail below with particular reference to FIGS. 2 to 10.

Figure 2:
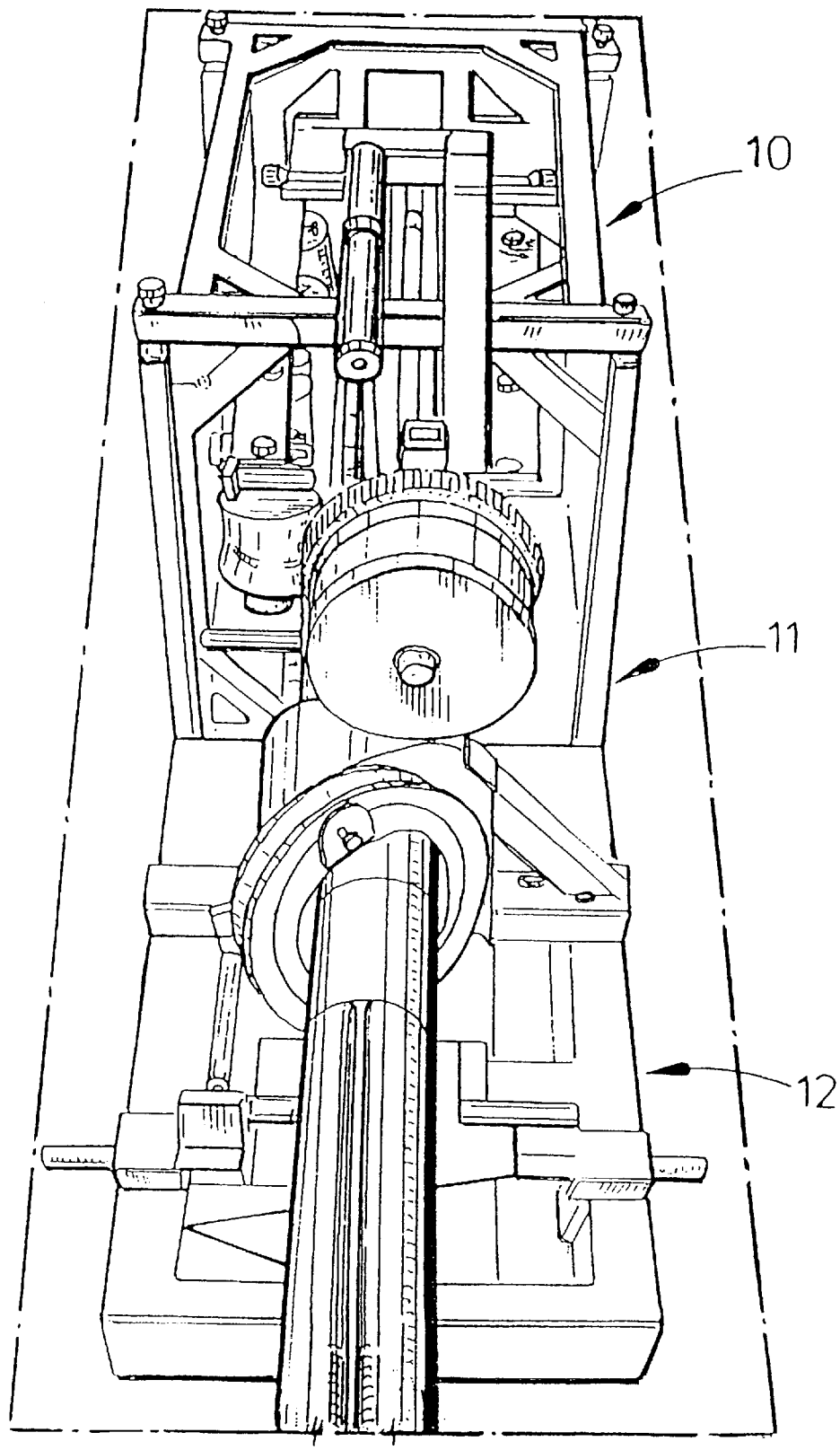
FIG. 2 is a front perspective view of pipe installation apparatus in accordance with a first embodiment of the present invention.

The Figures described below are taken from photographs of the apparatus off site FIG. 2 is a front perspective view of the apparatus which comprises deforming apparatus generally indicated by the reference 10 and binding apparatus generally indicated by the reference 11 both of which are mounted to a base frame 12. The deforming apparatus 10 and the binding apparatus 11 are described separately below.

Figure 3:
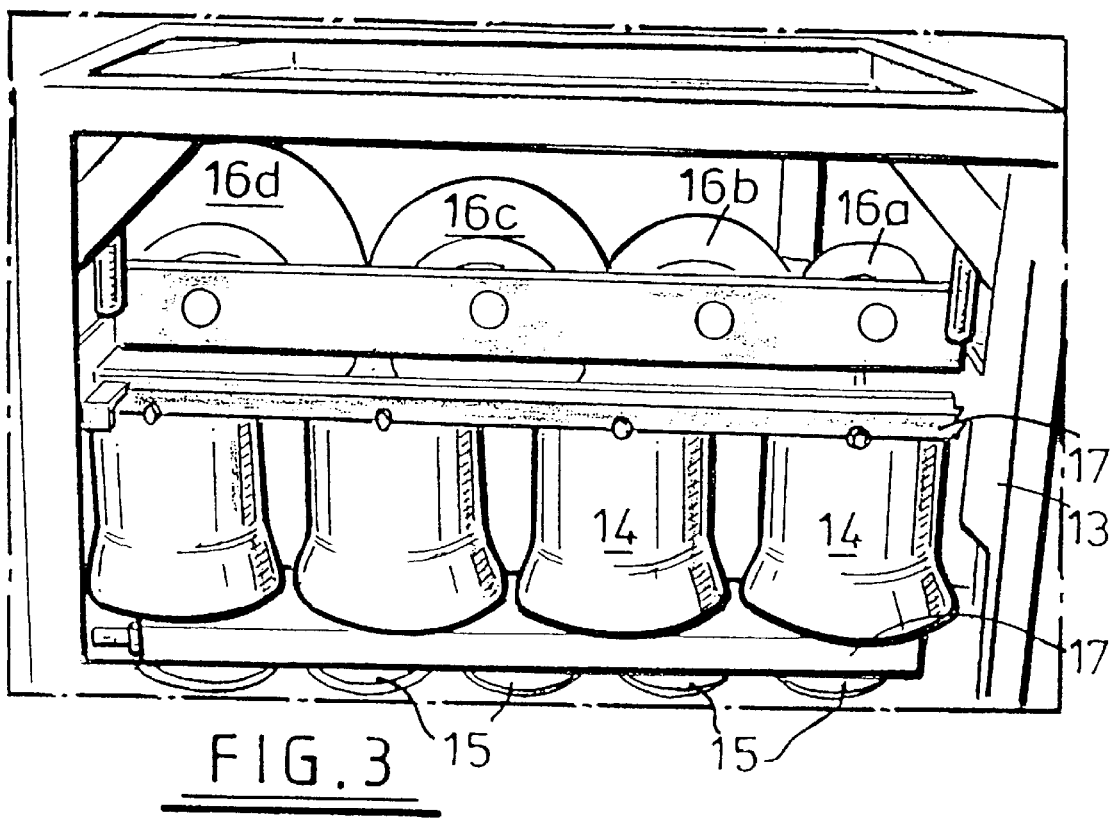

FIG. 3 is a side elevation of the deforming apparatus 10 from which it will be seen that the apparatus comprises a support frame 13 which supports two horizontally opposed sets of four side rollers 14 (only one set of which is visible in FIG. 3); a set of five bottom rollers 15; and four deforming wheels 16a–16d. The bottom rollers 15 are mounted about horizontal axes whereas the side rollers 14 are mounted about vertical axes within a frame portion 17 which is a sub-assembly of the support frame 13. The arrangement is such that the sub-frame 17 is horizontally adjustable relative to the frame 13 by setting adjustment screws 17a, (one of which Is visible in FIG. 3, and which are also visible in FIGS. 5 and 6).

Figure 4:
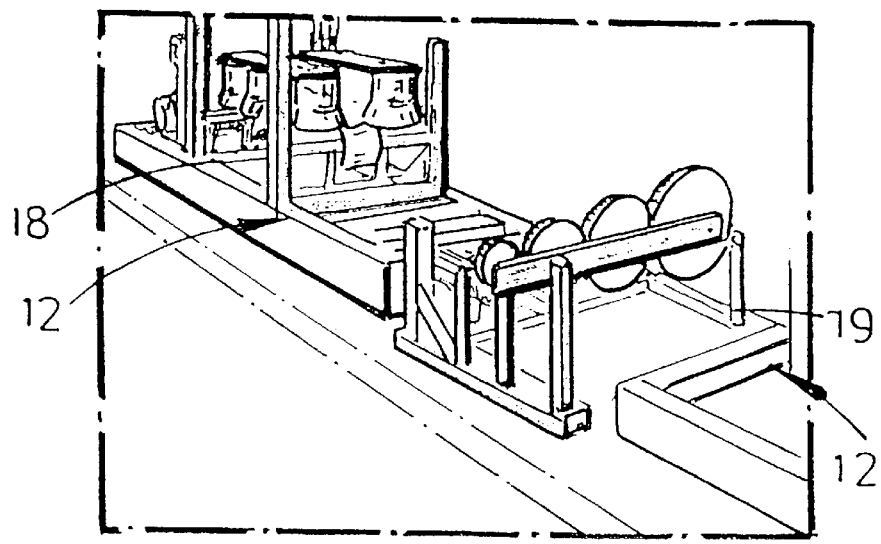

The deforming apparatus is constructed in separable lower and upper parts as shown in FIG. 4 and designated by references 18 and 19 respectively. The lower part 18 comprises that part of the flame 13 which supports the lower rollers 15 and the side roller sub-assemblies 13/14. In FIG. 4, the lower part 1 is shown mounted to a part of the base frame 12. The upper part 19 of the deforming apparatus comprises a mounting for the deforming wheels 16a–16d, the diameters of which increase in that order. Also visible in FIG. 4 is a second part of the support frame 12 which in the completed apparatus is telescopically received within that part of the base frame 12 to which the lower part 18 of the deforming apparatus is mounted.

Figure 5:
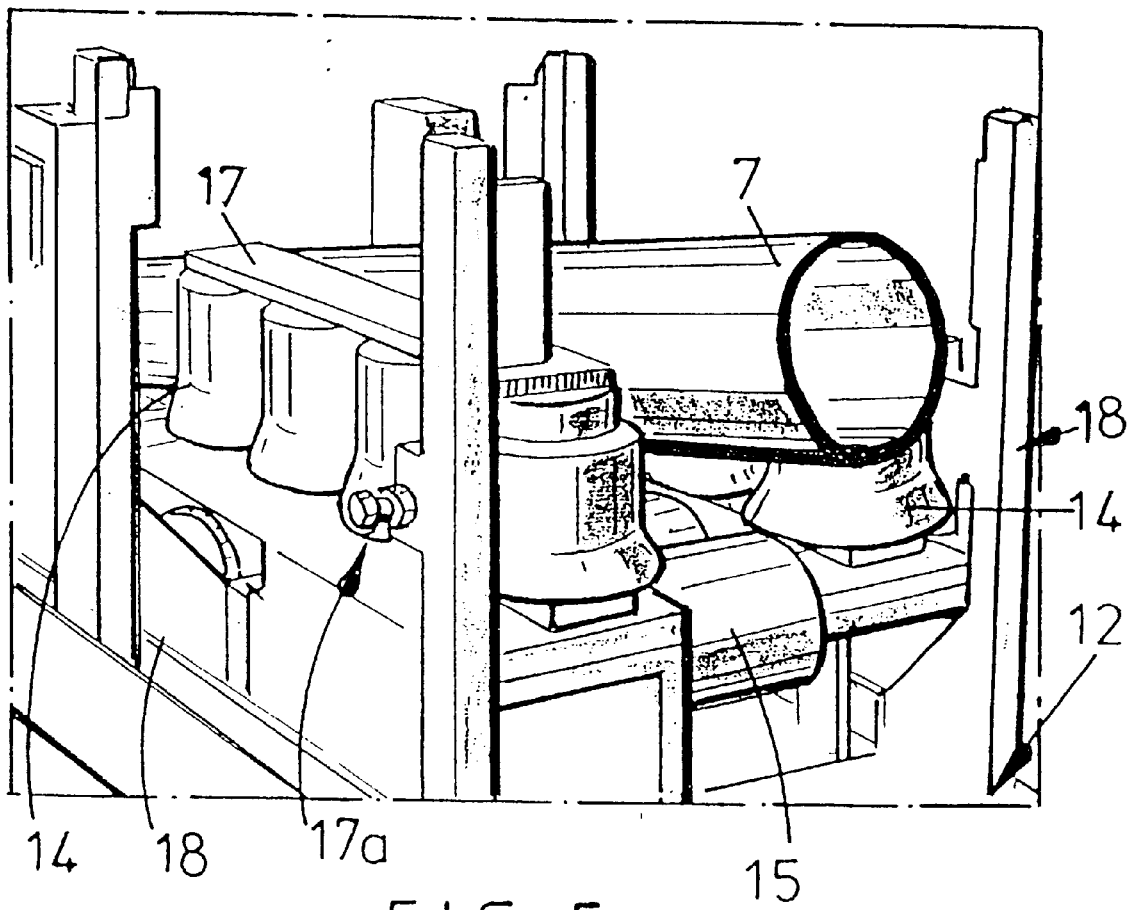

Operation of the deforming apparatus will now be described with reference to FIGS. 5 to 7, which, for ease of illustration, again show the deforming apparatus in isolation from the binding apparatus. Referring firstly to FIG. 5, initially a leading end: of the liner 7 is laid on top of the bottom rollers 15 and between the two sets of side rollers 14. From FIG. 5, it will be seen that the side rollers 14 have a curved profile corresponding generally with the profile of the liner 7. The horizontal position of the sets of side rollers 14 can then be adjusted to bear firmly against the liner 7.(by setting, of the adjustment screws 17a).

Figure 6:
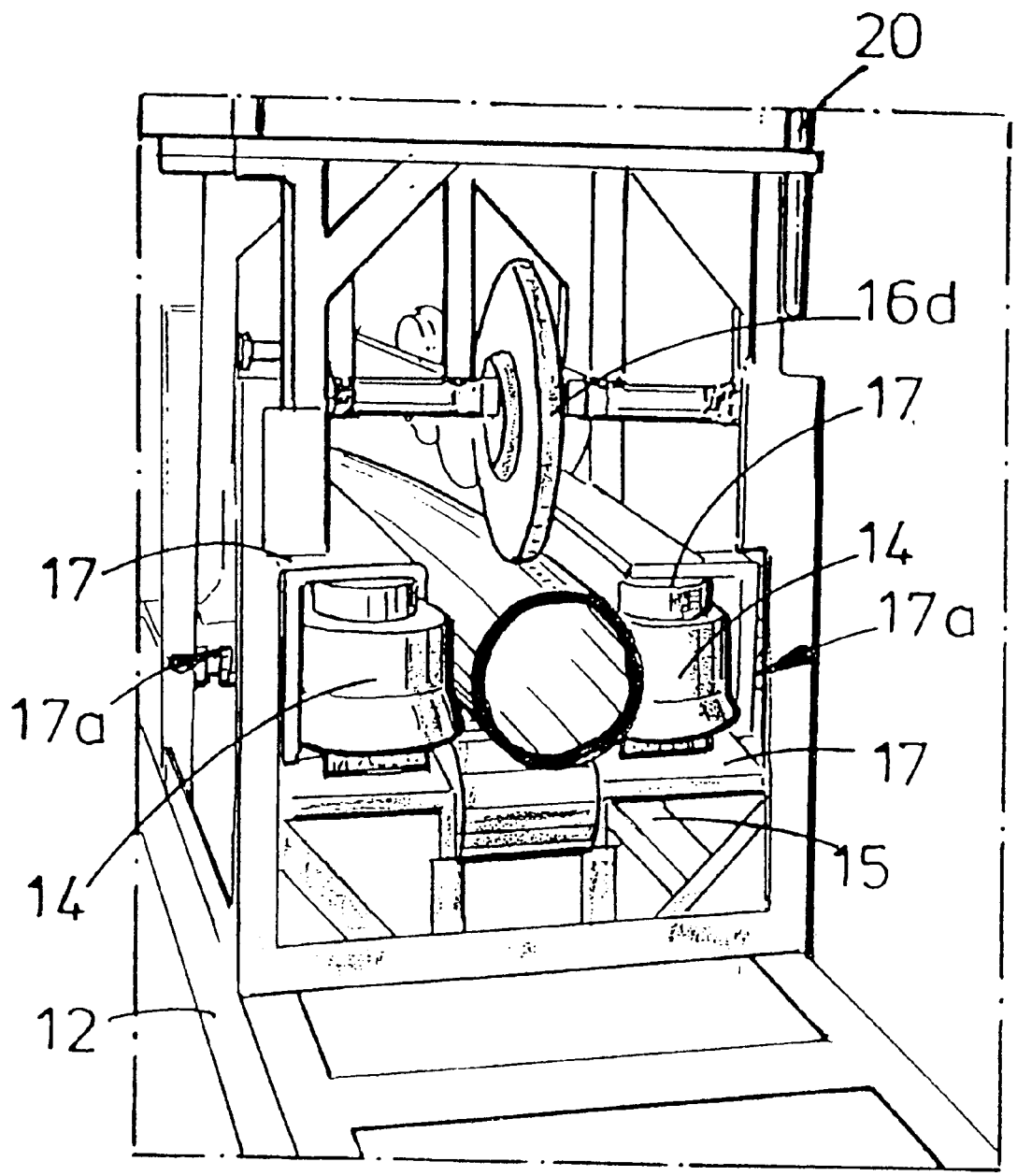

The top part 19 of the defoaming apparatus 10 is then fitted to tie bottom part 18 as Illustrated in FIG. 6. The two parts 18 and 19 are adapted to be slidable relative to one another so that their relative vertical positions ran be adjusted by way of bolts 20 one of which is visible in FIG. 6. Initially, the large diameter wheel 16d will rest upon the upper surface of the liner 7 as illustrated in FIG. 6. However, subsequent tightening of the nuts 20 (which may, for instance, be performed using standard compressed air, or other powered, torque wrenches) brings the two parts 18 and 19 of the deforming apparatus together so that the deforming wheels 16a to 16d deform the pipe section into a U-shape cross-section as illustrated in FIG. 7. The positioning of the side rollers can then be adjusted further to "fine tune" the deformed profile of the liner.

Although the adjustability of the deforming apparatus can accommodate a range of liner diameters (within a limited range), it will be appreciated that different size apparatus can be provided.

In the actual Liner installation process it will be appreciated that the liner will be drawn through the deforming apparatus 13 by the winch 6 and will thus be deformed along its length as it does so by the deforming wheels 16a to 16d.

The direction of travel of the liner will be from the smallest diameter wheel 16a to the largest diameter wheel 16d so that the deformation of the liner 7 is progressive as it travels through the deforming apparatus 10. In the liner installation process the liner will pass straight from the deforming apparatus 10 to the binding apparatus 12 in its deformed configuration. The binding apparatus is described in more detail below with reference to FIGS. 8 to 10.

Figure 9:
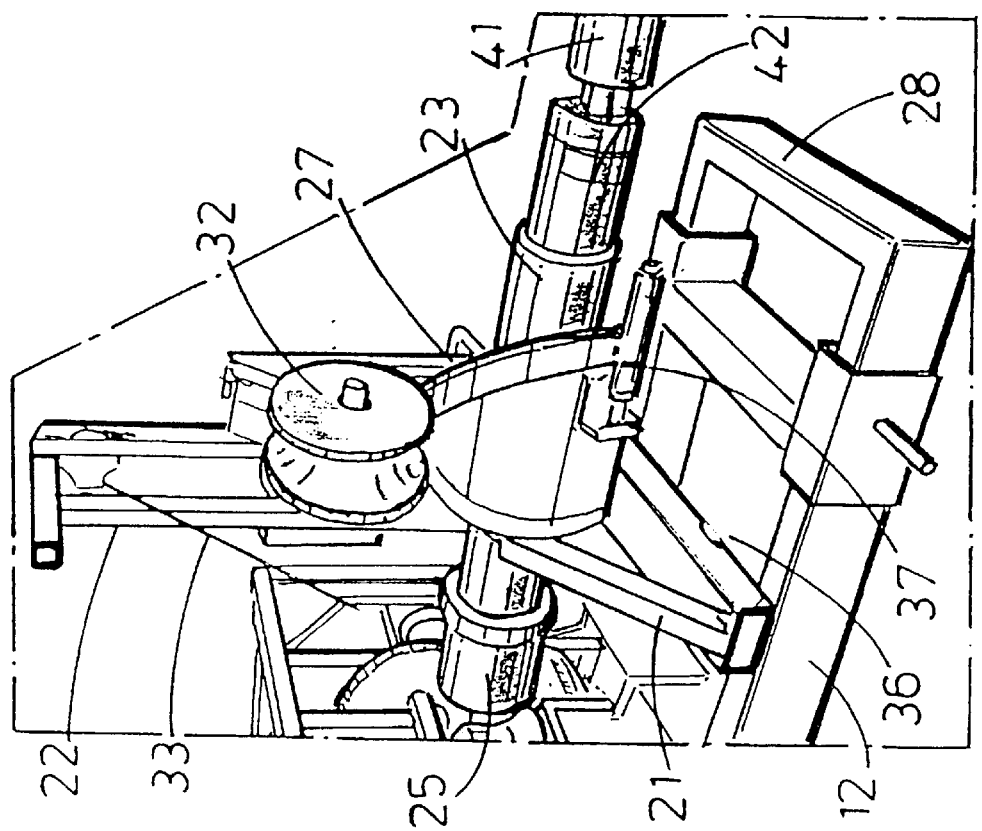
FIGS. 8 to 10 illustrate to features and operation of a second part of the apparatus of FIG. 2.
Figure 8:
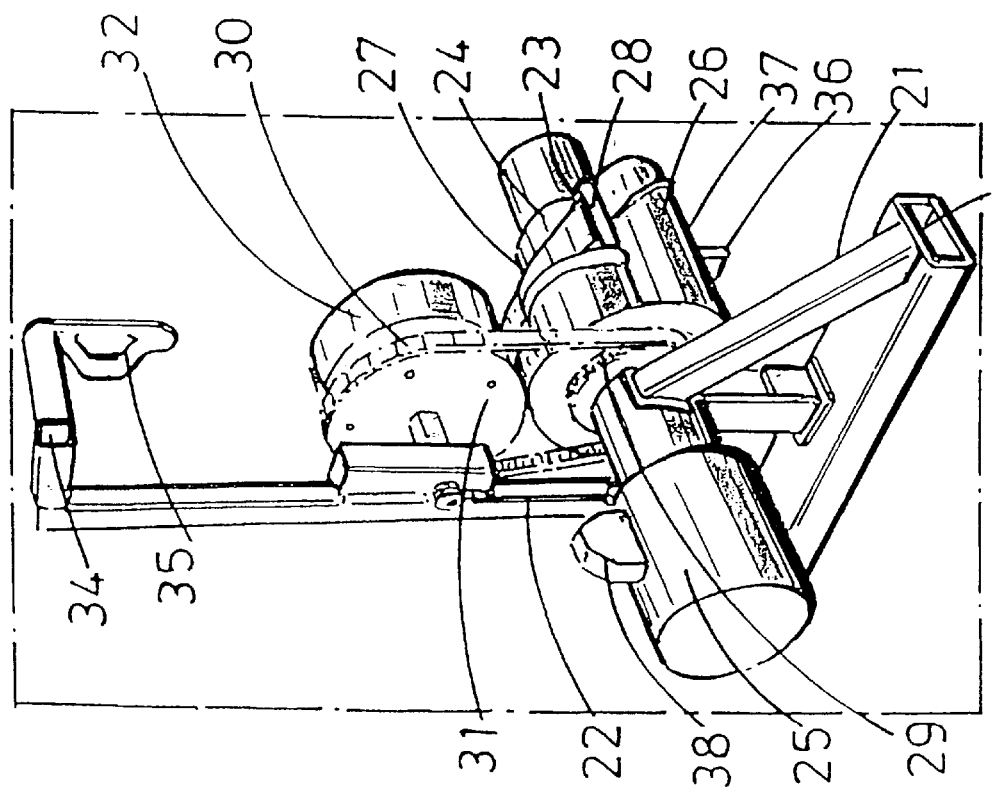
Figure 10:
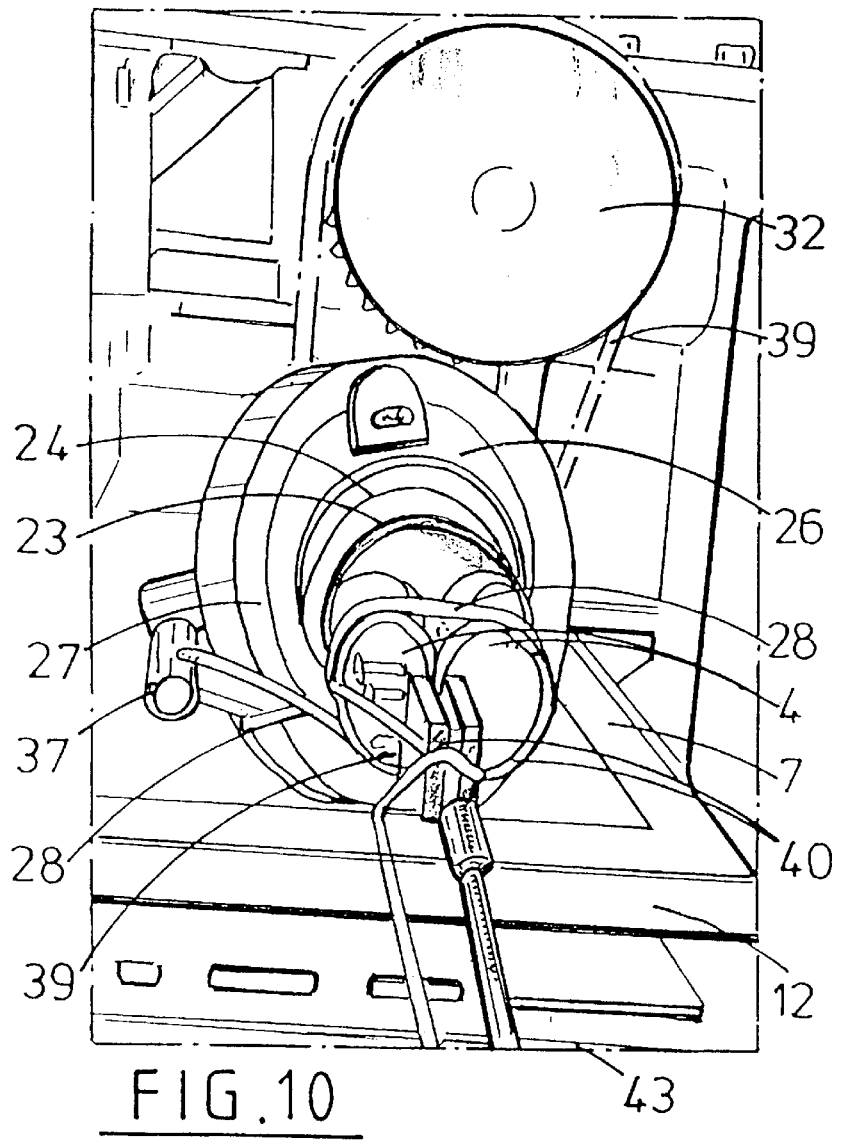

FIG. 8 is a rear perspective view of the binding apparatus 11 separated from the deforming apparatus 10. FIGS. 9 and 10 on the other hand show the binding apparatus mounted to the base frame 12 in front of the deforming apparatus 10, and with a leading length of liner 7 inserted therein. The binding apparatus 11 comprises a lower support stand 21 and a vertical support arm 22. The stand 21 supports a horizontal steel tube 23. An externally cylindrical but internally tapered plastics end piece 25 is fixed co-axially to one end of the tube 23. The end piece 25 is designed to guide the deformed liner 7 into the tube 23 from the, deforming apparatus 10, and also to complete the deformation of the liner 7 by closing the spacing of the lobes of the U-shaped cross-section (the lobes cannot be closed together in the deforming apparatus because of the presence of the deforming wheels 6a to 6d therebetween) to further reduce the cross-section.

A generally cylindrical plastics bearing 26 is mounted for co-axial rotation about the tube 23 between plastic collars 24 that restrain the bearing 26 against axial movement along the length of the tube 23. One axial end of the bearing 26 is angled and supports a bobbin 27 of a self adhesive glass fibre reinforced plastics tape 28 (which is wound sticky side outermost). The bobbin 27 lies in a plane that is angled to the axis of the tube 23. The opposite axial end of the bearing 26 is fitted with a toothed pulley wheel 29 which is connected via a chain drive 30 to a further toothed pulley wheel 31 which is mounted to the support arm 22 above the bearing 26. The pulley wheel 31 carries a spool 32 of a fine but strong cord 33 (e.g. a composite outer braided polymeric cord).

The uppermost end of the support arm 22 terminates in a laterally extending arm 34 which supports a pulley 35 above the spool 32.

The bearing 26 includes a mounting flange 36 which extends from its circumference near the foremost portion of its front rim and which supports a planetary roller 37 which extends forward of the bearing 26 to the front edge of the tube 23 and parallel with the axis of the tube 23. Finally, a pulley 38 is mounted to the top of the end piece 25.

Operation of the binding apparatus 11 will now be described, with reference in particular to FIGS. 9, 10 and 2, all of which show the binding apparatus 11 mounted to support frame 12 in front of the deforming apparatus 10 and with a length of liner 7 travelling therethrough. It will be appreciated that the liner 7 is pulled through the apparatus by the winch cable which is secured to a leading end of the liner 7. One method of attachment of the winch cable to the liner 7 is illustrated in FIGS. 9 and 10. Here, the winch cable is looped around a bolt 39 which extends between two rectangular steel plates 40. The opposite ends of the rectangular plates 40 are bolted together on either side of internal portions of the U-shaped liner by bolts 41 which are accessed through holes 42 drilled through the liner wall. A nose piece 43 is fixed to the winch cable ahead of the leading end of the liner 7 to aid in the subsequent passage of the liner into a the pipe being lined.

Also connected to the winch cable is the cord 33 which is supplied from the spool 32, and which passes over the top pulley 35 and down to the pulley 39 mounted on the end piece 25, from where it threads through an aperture in the end piece 25 so as to join the liner 7 and pass through the tube 23 along side the liner 7.

As the liner 7 leaves the rollers of the deforming apparatus 10 it enters the tube 23 via the end piece 25 which completes the formation of the desired cross-section. As the leading end of the liner 7 emerges from the front end of the pipe 23 it immediately tries to expand to regain its original circular cross-section. However, with only a short length of liner 7 extending from the tube 23 (which will not be able to expand substantially) a length of tape 28 is unwound from the bobbin 27, passed around the planetary roller 37 and wound several times around the end of the liner 7 (trapping the cord 33) to secure it thereto. This is the arrangement illustrated in FIG. 9. It will be appreciated that since, as mentioned above, the tape 28 is wound onto the bobbin 27 sticky side outermost, the sticky side remains outermost as the tape passes around the roller 37 but is innermost when the tape is wound around the liner 7 as illustrated in FIG. 9.

Once the tape 28 has been secured to the front end of the liner 7, winching of the liner 7 through the binding apparatus 11 can be continued. As the cord 33 is drawn off the spool 32, the spool 32 will rotate which in turn will rotate the bearing 26 via the chain drive 38. Thus, as the liner (and cord) travel through the pipe 23, the bearing 26 and thus the bobbin 27 and planetary roller 37 will rotate about the tube 23. This results in the tape 28 being helically wound around the liner 7 as the liner travels through, and exits, the tube 23. In this way, the liner is bound in its deformed configuration along its length.

It will also be appreciated that the binding operation will be synchronised with the speed of travel of the liner 7 by virtue of the drive mechanism used. In addition because the cord 33 is secured to the liner 7 via the tape 28 wherever the tape 28 crosses the cord, any possible loss of synchronisation through stretching in the cord will be minimised. That is, the maximum "stretchable" length of the cord will be that length extending between adjacent turns of the helical tape winding.

It will also be appreciated that the pitch of the winding, will be determined by the angle of the end face of the bearing 26 to which the bobbin 27 is mounted. A simple computer programme may be used in determination of the required bobbin angle etc. to achieve the desired helical winding pitch. For example the pitch may generally be in the range of 100 mm to 400 mm, most typically being in the range of 130 to 230 mm.

Turning now to the schematic illustration of FIG. 1, operation of the apparatus on site will now be described. The deforming apparatus 10 and binding apparatus 11 are mounted to the base frame 12 which is itself installed in the excavation 3 so that the tube 23 and rollers 14 are in line with the axis, of the pipe section 1. The winch cable is then passed through the pipe section 1, and through the liner installation apparatus, from the opposite excavation 2 and secured to the end of the liner 7 in the manner described above. The liner 7, in its semi-layflat configuration is then drawn from the reel 8 vertically downwards into the excavation 3 and around a guide roller (not shown) to redirect the liner 7 to the deforming apparatus 10 on the axis of the pipe section 1. The liner 7 is then drawn through the rollers of the deforming apparatus 10 and is deformed into a generally U-shaped cross-section as described above. From the deforming apparatus 10, the liner 7 enters the tube 23 of the binding apparatus 11 via the end piece 25.

Before the leading end of the liner 7 enters the tube 23 a thin rope or similar cable (not shown) is connected to the end of the winch cable so that the rope is drawn into the tube 23 together with the liner 7 and is enclosed within the lobes of the U-shaped liner as they are forced together by the internal tapering of the end piece 25 (as described above).

As the leading end of the liner 7 exits the tube 23 the winching process is temporarily halted whilst the tape 28 is secured to the liner 7. Winching is then continued and the liner is bound in its deformed configuration by the tape 29 which is helically wound around the liner 7 as it exits the tube 23. The bound liner 7 is thus drawn into the pipe section 1 together with the rope (not shown) which is trapped within its profile.

Once the liner 7 is fully winched into position in the host pipeline the rope (not shown) is detached from the towing winch and a sharp cutting device (not shown) is mounted to one end of the rope. The rope is then withdrawn from the host pipe 1, which may be done by hand, such that the cutting means is drawn along the length of the liner 7 between the lobes of its U-shaped cross-section so as to cut through the binding tape 28. The cutting operation will be relatively easy given the high tension that the tape 28 will be under (as the liner 7 attempts to expand into its pre-formed circular cross-section), and given that because the tape is self adhesive the cutting of one "winding" will not release the tension in the next "winding".

On release of the binding tape 28 the liner 7 will expand to a near circular cross-section. To complete the liner installation procedure, pressurised fluid (e.g. water or gas such as nitrogen) may be introduced into the liner 7 to expand it into contact with the inner surface of the host pipe line 1. Conventional end couplings can then be fitted to each end of the lined pipeline. Although the tape 28 will remain trapped in the pipeline between the liner 7 and the pipe 1, this will not cause any problems given that the tape may be extremely thin (e.g. of the order of 0.2 mm) pressurised fluid (e.g. a gas such as air or nitrogen, or a liquid such as water) could also be used to "burst" the binding rather than using the cutting means described above (a pressure of 10–15 psi has been found to be sufficient). Releasing of the binding and expansion of the liner could then, be accomplished in a single operation.

It will thus be seen that the present invention provides a method and apparatus for rehabilitating an existing pipeline by fitting it with a continuous, joint-free, lining which is a close fit with the host pipe wall in service. The thin wall thickness of the liner facilitates ready on-site handling/ forming but the relatively low hoop strength of the liner does not reduce the effectiveness of the lining since the main pressure resistance is provided by the original host pipeline. The liner is, however, capable of supporting the necessary pressure over pin holes and joint gaps that may be present within the pipeline. Furthermore, the thin wall thickness is advantageous in that it allows the liner to be initially supplied with a circumference smaller than the internal circumference of the pipe since it may be expanded beyond its original dimensions, and possibly beyond its elastic limit, by internal pressure (which may be in service pressure) so that It Is pressed into a close fitting with the internal surface of the pipe.

Thus, use of such a thin wall liner provides for ease of installation in combination with a close fitting resultant lining which is often hot possible with conventional relatively thick liners. For instance, with relatively thick liners a compromise often has to be reached. That is, some processes rely upon determining the minimum bore that is likely to be encountered in the pipe line, and others the maximum bore, with the size of lining being chosen accordingly. Not only does this introduce practical difficulties in that prior determination of the required liner size cannot generally be made (leading to manufacturing and stock problems) but also once installed the liner may be either a loose fit in places, or be prevented from assuming a circular cross section in places, both of which are undesirable.

It will also be appreciated that use of thin walled liners facilitates transportation of long (e.g. 200 meter) lengths of liner compactly coiled in a semi-layflat configuration. For instance, a typical thin liner (having a wall thickness between 2.5 and 3.5 mm) used in accordance with the present invention may layflat with a total thickness of around 25 mm and a width of approximately half its normal circumference.

The use of thin wall polyethylene liner pipe is also advantageous in that such material is low cost and easily manufactured. In addition, since the ends of the liner can be readily factory heat weld sealed, and since the hot melt extrusion process ensures initial sterilisation, absolute hygiene can readily be maintained during transportation and installation (if the end of the liner is welded closed the method of attachment of the winch cable will have to be modified).

In some cases, it may be necessary to meet additional sterilisation standards. For example, some water companies in the UK require liners to be sterilised by timed contact with chlorinated water. With existing processes this is generally carried out oil site subsequent to installation of the liner which Introduces a delay between installation of a liner and return to service of the pipeline. However, in the present case it is envisaged that such sterilisation requirements can be met before the liner is delivered on site. That is, the liner could be flooded or partially flooded, with the required sterilising solution by the liner manufacturer, via a suitably secure self sealing connection. After the required contact period samples could then be drawn off for industry standard testing and sterility approval before dispatch of the liner for installation in an existing pipeline. Not only will this eliminate the delay mentioned above, but it will also enable the sterilisation and testing procedure to be more carefully controlled in accordance with required standards.

A further advantage of the present invention over some existing close fit slip lining methods is that the operation is performed at ambient temperature. That is, with some existing systems it is necessary to heat the liner either to deform it or to return its circular cross-section. In addition, since heating is not required, and since relatively light winching loads may be used (because the deformation and binding is performed on line with the pipe), there is no significant extension of the liner during the installation process. Thus, there is no requirement for post insertion relaxation which is necessary with many known processes (in certain cases up to sixteen hours can be required for such relaxation).

It will be appreciated that many modifications made are made to the detailed construction of the apparatus described above. For instance, the cord 33 could be introduced to the liner 7 so that it is trapped within the closed deformed profile (the "cleavage")of the liner 7 rather than taped to its outer surface. Although with longer lengths of liner this may introduce problems with synchronisation of the winding operation (due to stretching of the cord 33 as mentioned above) it might offer an advantage in that the cord 33 could be used to pull the cutting device back through the pipeline once the liner is installed so that an additional rope as mentioned above would not be required. Alternatively, rather than the drive means described above, rotation of the binding unit may be manual or may be controlled by a simple external power means, such as an electric motor. The binding unit may, as a further alternative, be driven by a short belt drive from rollers of the forming apparatus which are rotated by passage of the liner through the forming apparatus. This would also give a simple drive mechanism which is always synchronised with the speed of winching of the liner.

Figure 11:
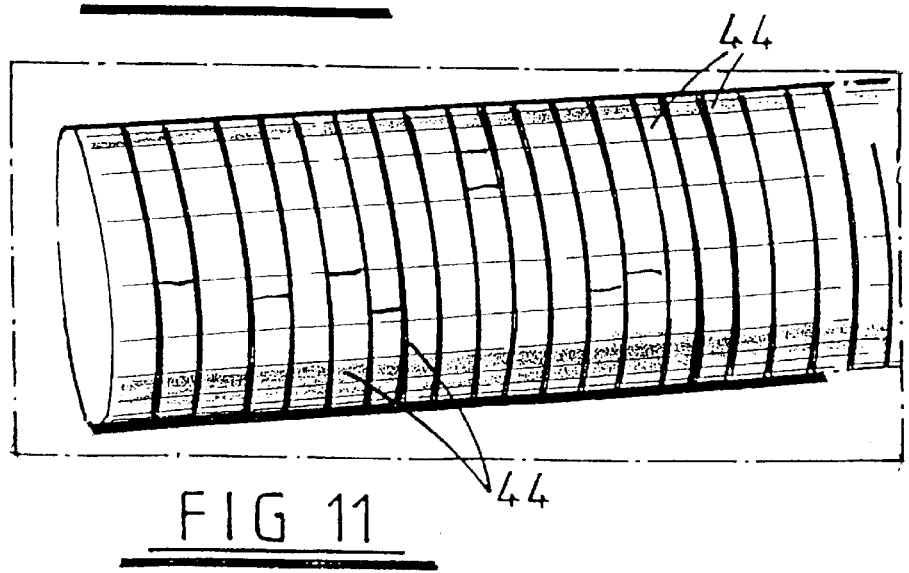
FIGS. 11 to 13 illustrated a first modification to the apparatus of FIG. 2 and FIGS. 14 to 21 illustrate a second modification to the apparatus of FIGS. 2 to 10.
Figure 12:
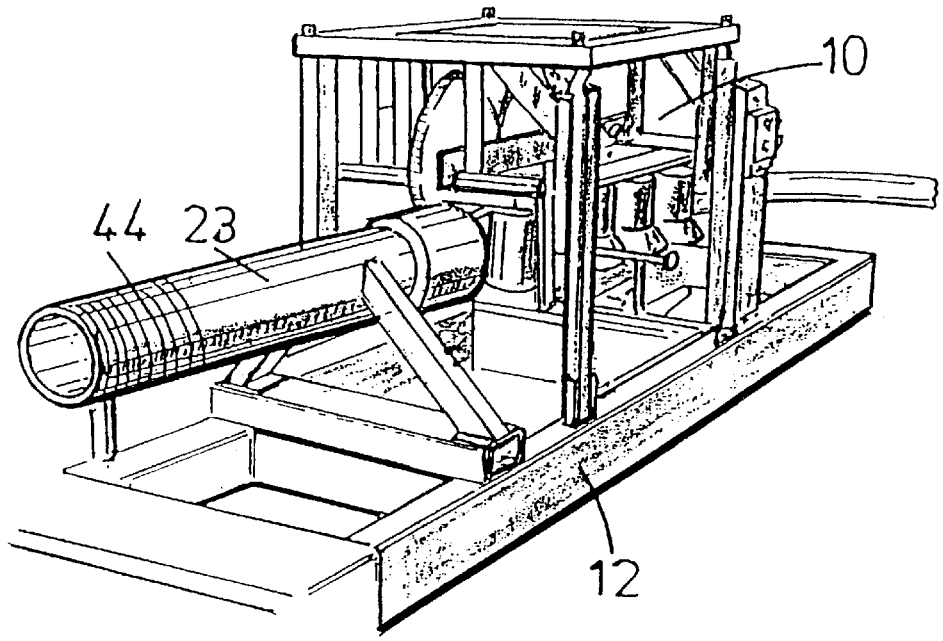
Figure 13:
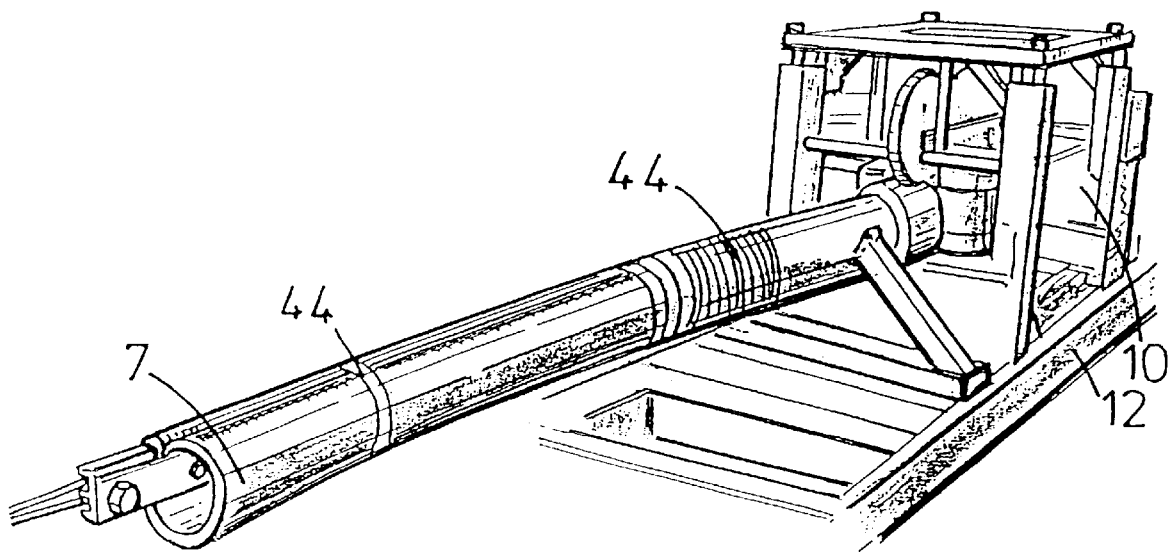

As a more extensive possible modification, the helical binding apparatus described above could be replaced by other methods of binding. Such an alternative is illustrated in FIGS. 11 to 13. In this embodiment of the invention, the binding apparatus simply comprises an elongated tube 23 which has a number of hooped binding straps 44 preloaded onto it (i.e. before the liner installation is begun) such that they encircle its external circumference. The binding straps 44 are preferably manufactured from short lengths of glass fibre re-enforced polypropylene, ends of which are overlapped and welded together. Straps may typically have a thickness of about 0.5 mm, and a width of about 12 mm. The circumference of the straps will be selected as appropriate for the size of the liner in order to restrain the deformed liner in the desired reduced cross-section to enable it to be drawn into the pipe. The narrow width of each individual enables a relatively large number of identically sized straps to be mounted on a relatively short length of magazine tube. Adjacent straps may be linked together by ties (not shown) of a length corresponding to the desired spacing (typically 400 mm–500 mm) at which the straps are to be positioned on the liner.

As the leading end of the liner 7 emerges from the downstream end of the tube 23, a first binding strap 44 is manually cast off from the tube onto the liner 7. The liner 7 will then expand slightly as it attempts to resume the circular cross-section in which it was originally manufactured until slack in the strap 44 is taken up which prevents further expansion of the liner 7. As the liner 7 continues to pass through the tube 23 successive binding straps 44 can either be manually cast off the tube 23 or may be pulled onto the liner 7 by virtue of ties that interconnect them. Thus, in the latter case, whilst the first strap 44 may be manually cast off, subsequent positioning of binding straps 44 on the liner 7 may be automated. It will be appreciated that in this case spacing of the straps will be controlled by the length of the ties that connect them, which can be pro-selected as appropriate.

A further modification of the apparatus of FIGS. 1 to 10 described above is illustrated in FIGS. 14 to 21. This apparatus comprises deforming apparatus 110 constructed in separable upper and lower parts 118 and 119 respectively, and binding apparatus 111, both of which are mounted on a common support base frame 112. These components are described in more detail below.

Figure 14:
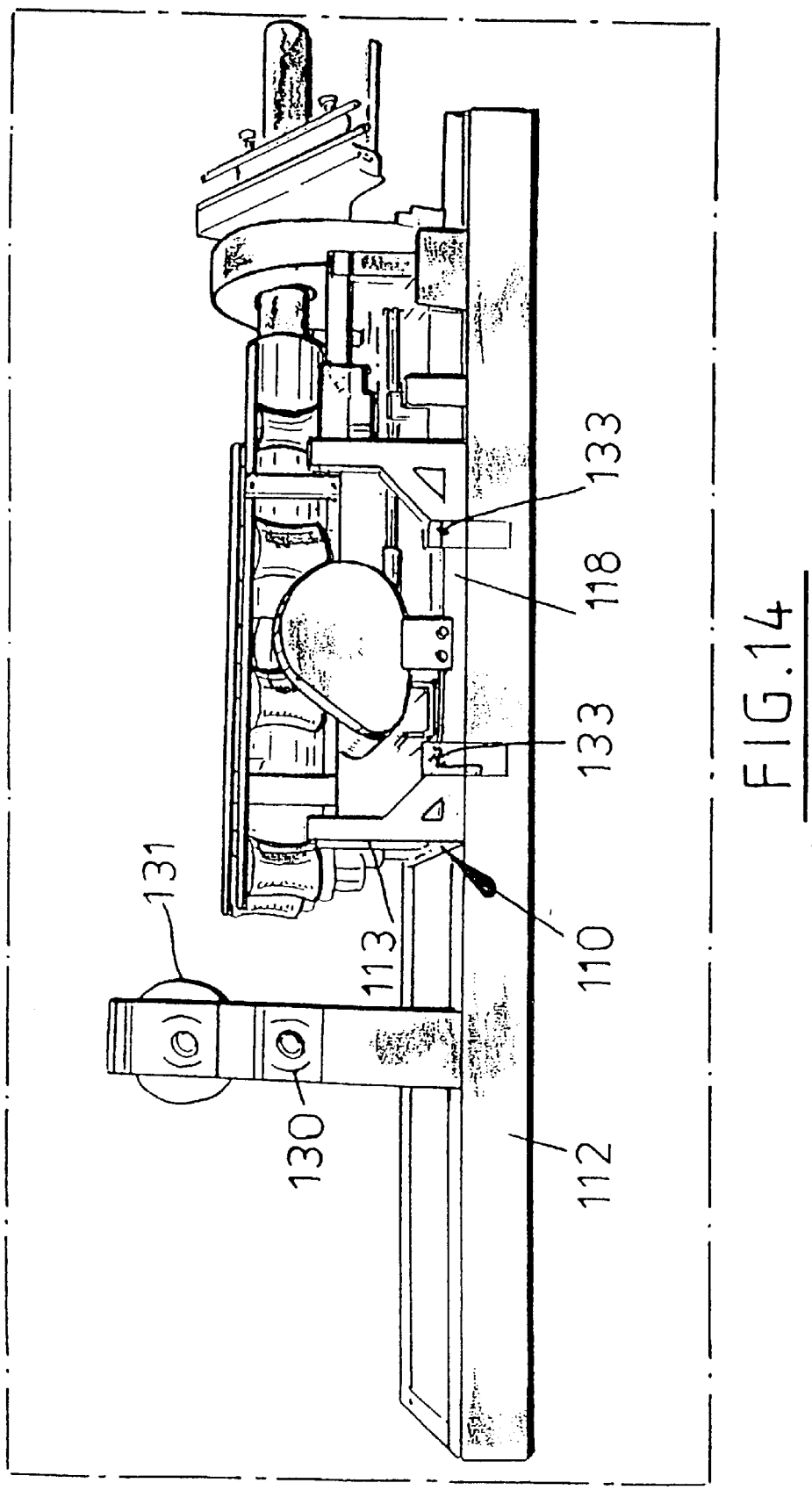
Figure 19:
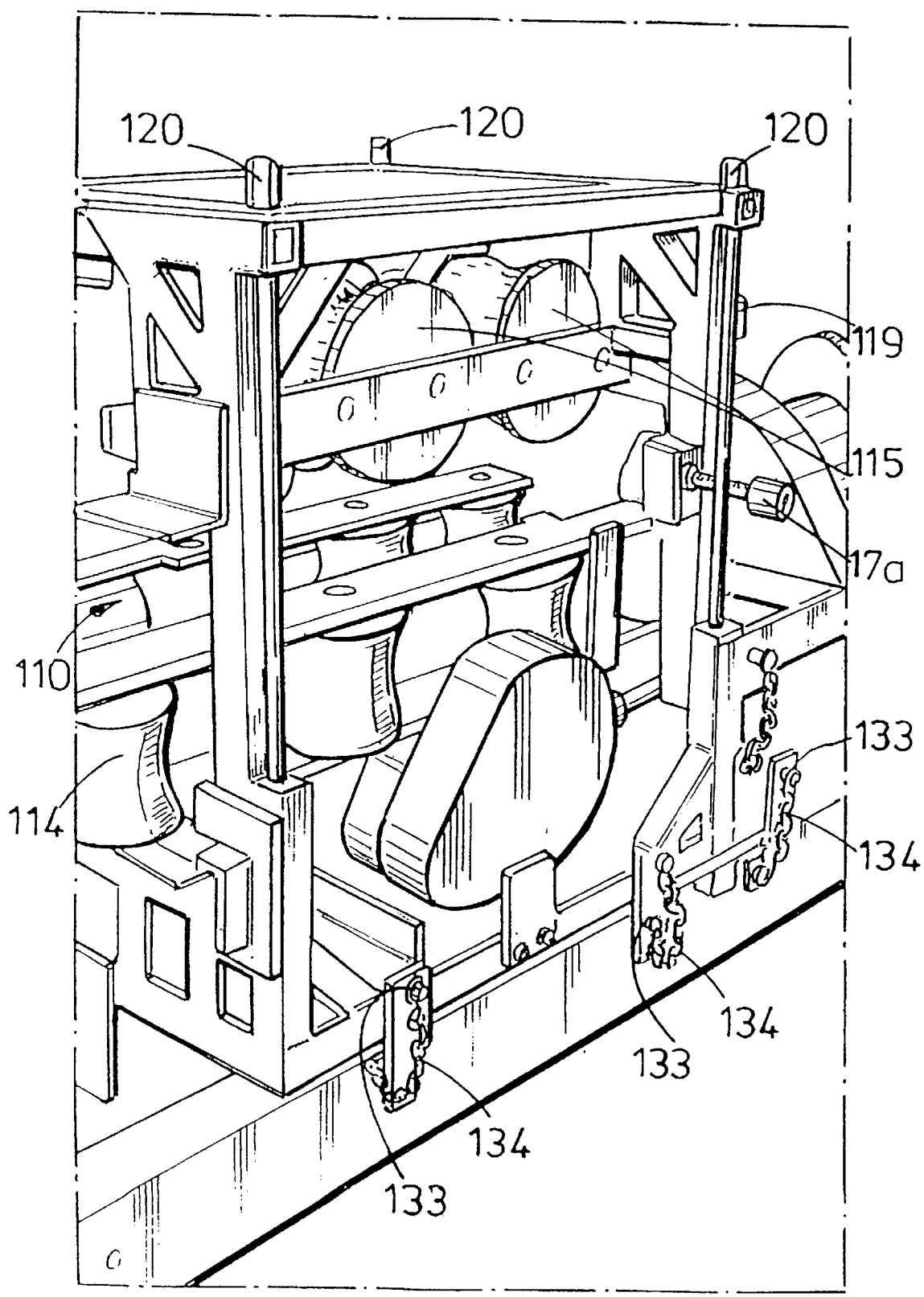
Figure 20:
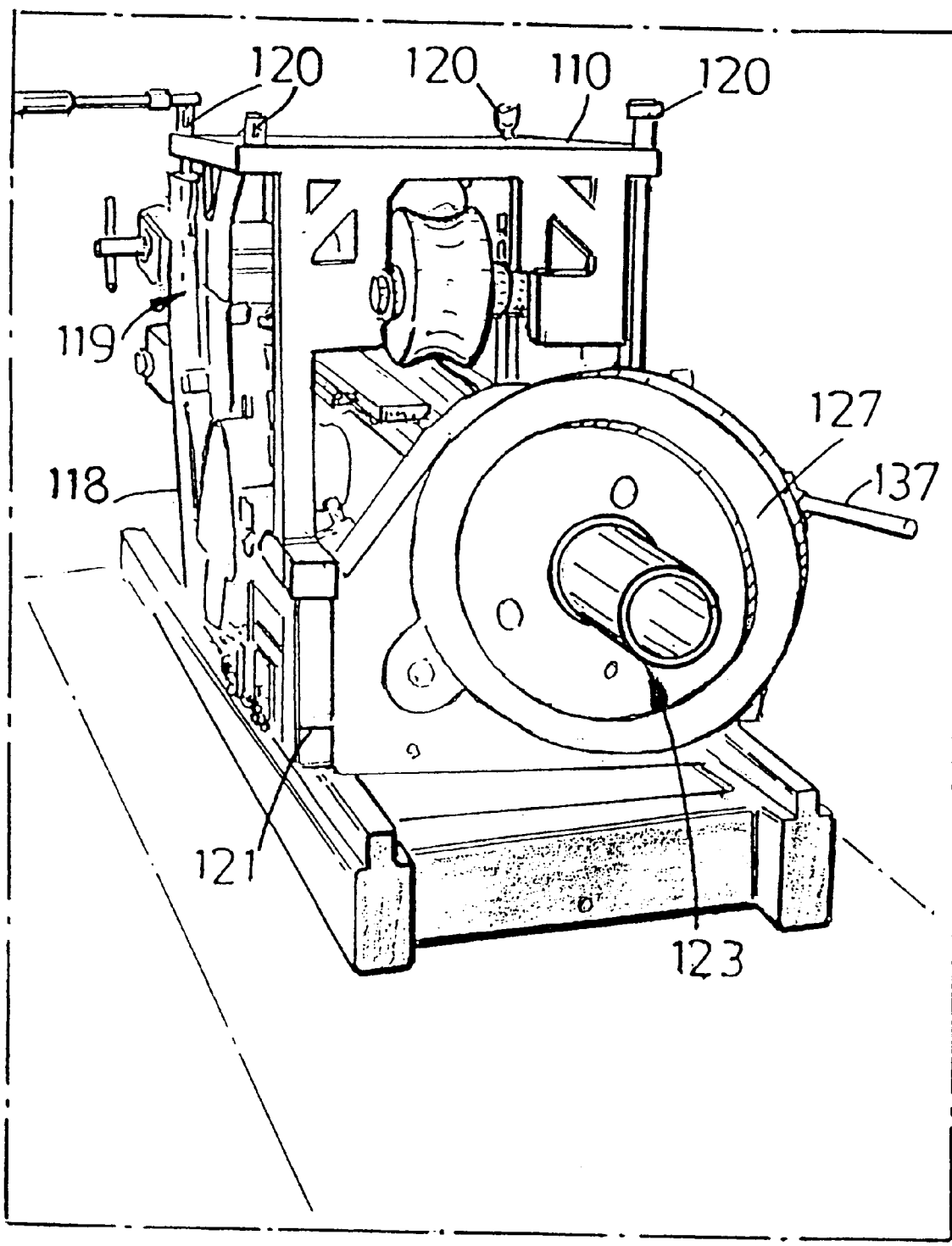
Figure 21:
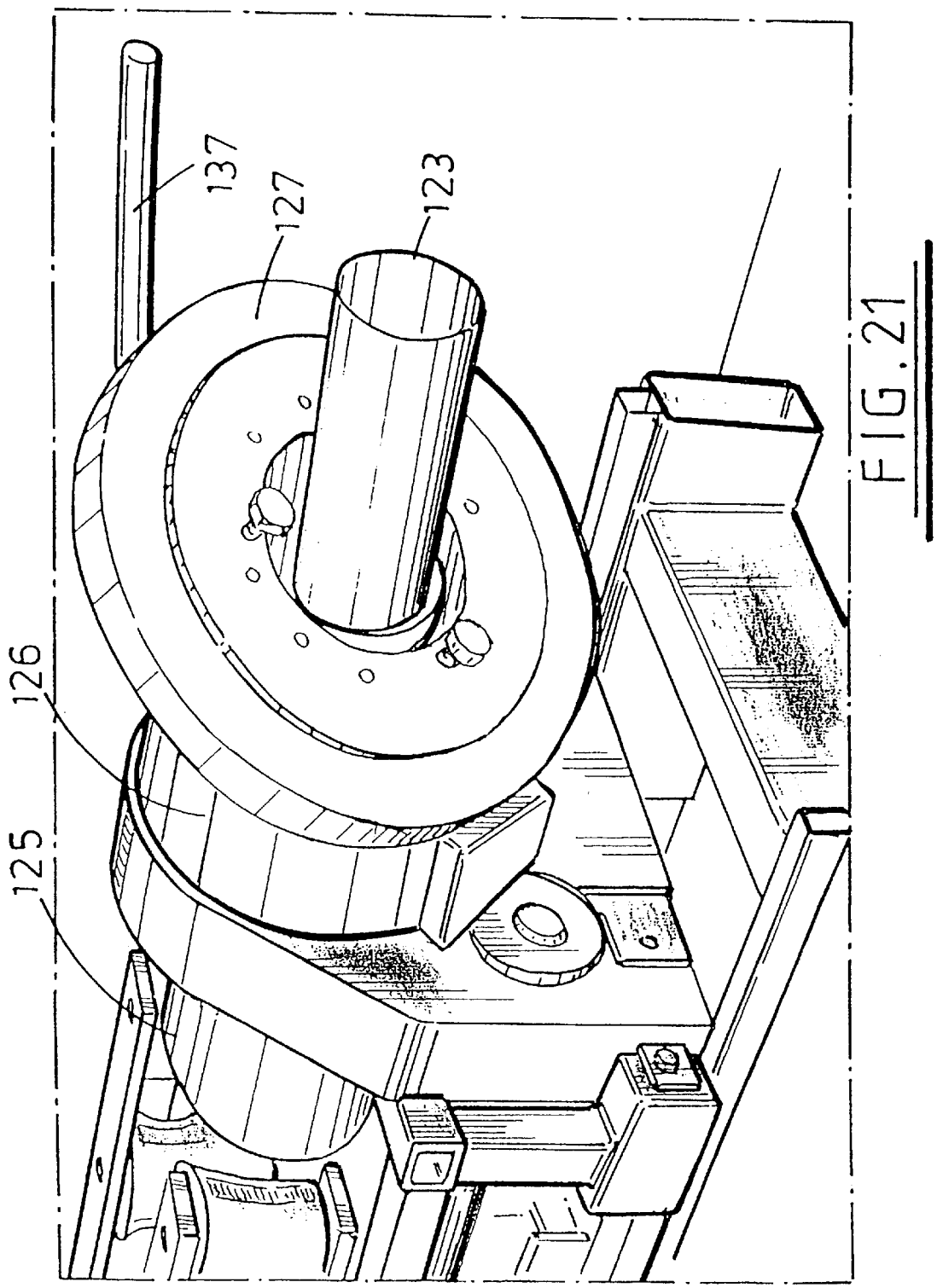

FIG. 14 shows the apparatus prior to fitting of the upper portion 119 of the deforming apparatus 110, whereas FIG. 19 shows the complete deforming apparatus 110 with upper and lower parts 118 and 119 assembled together. The deforming apparatus essentially comprises the same components as the deforming apparatus described above, namely: a support frame 113 which supports two horizontally opposed sets of four contoured side rollers 114 (mounted for rotation about vertical axes); three deforming wheels 116a–116c, and three horizontal rollers 115 which oppose the deforming wheels 116a–116c, The deforming wheels are of equal 8 inch diameter (as can best be seen from FIGS. 17 and 18 which show the lower part 118 with side rollers 114 removed) and have progressing decreasing widths, (116a=1.5 in, 116b=1 in and 116 0.5 in) The sets of side rollers 114 are again mounted within subframe assemblies 117 which are horizontally adjustable relative to the support frame 113. A significant difference between this apparatus and the apparatus described above is that the deforming wheels 116a–116b arm mounted within the lower part 118 of the deforming apparatus 110 and the horizontal rollers 115 are mounted in the upper part 119. The deforming apparatus operates in essentially the same way as that described above, the effect of the reversal of the positioning of the horizontal rollers 115 and the deforming wheels 116a–116c being that the "fold" is formed underneath the liner. The significance of this is discussed below.

Figure 15:
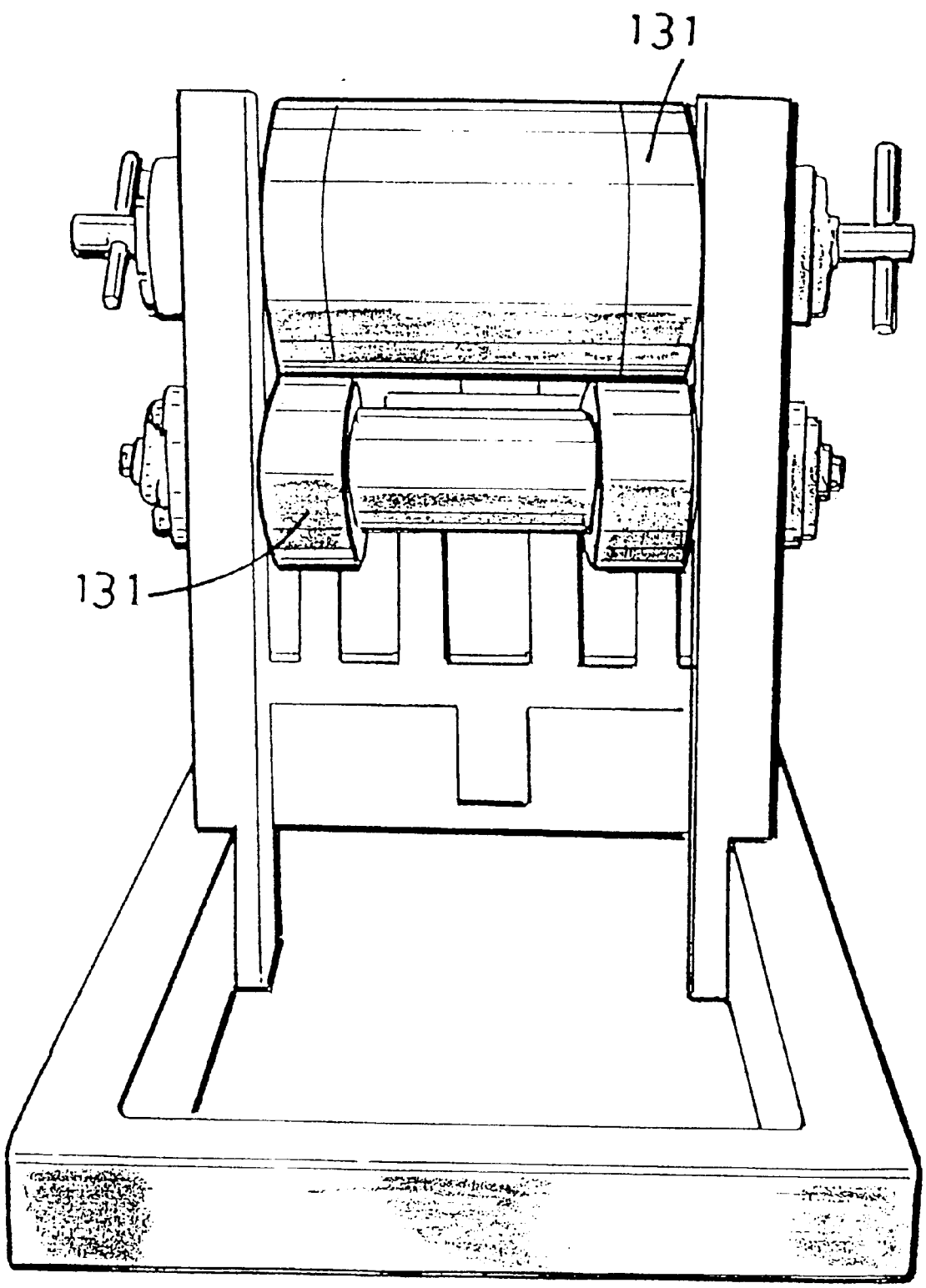
Figure 16:
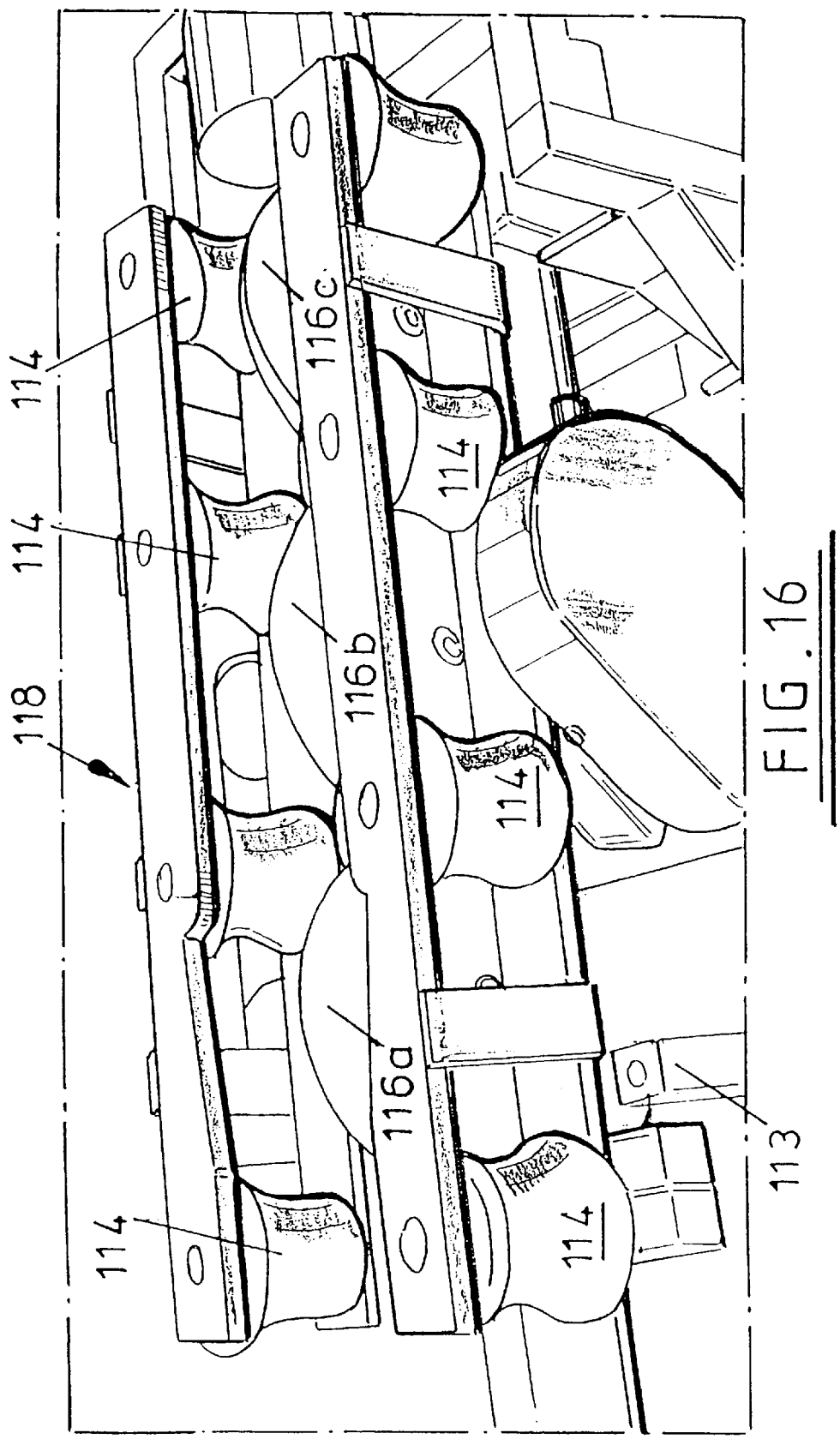
Figure 17:
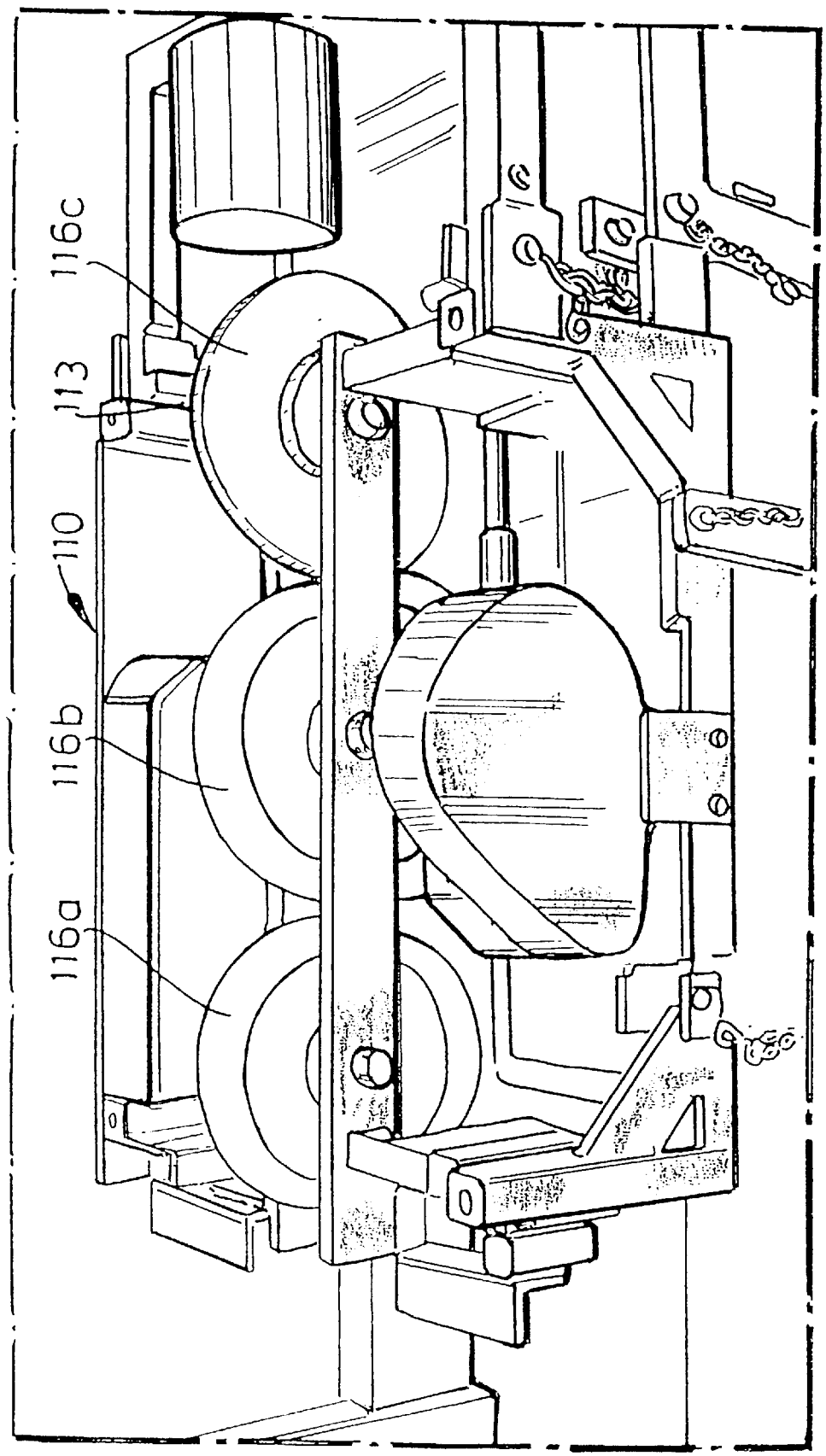
Figure 18:
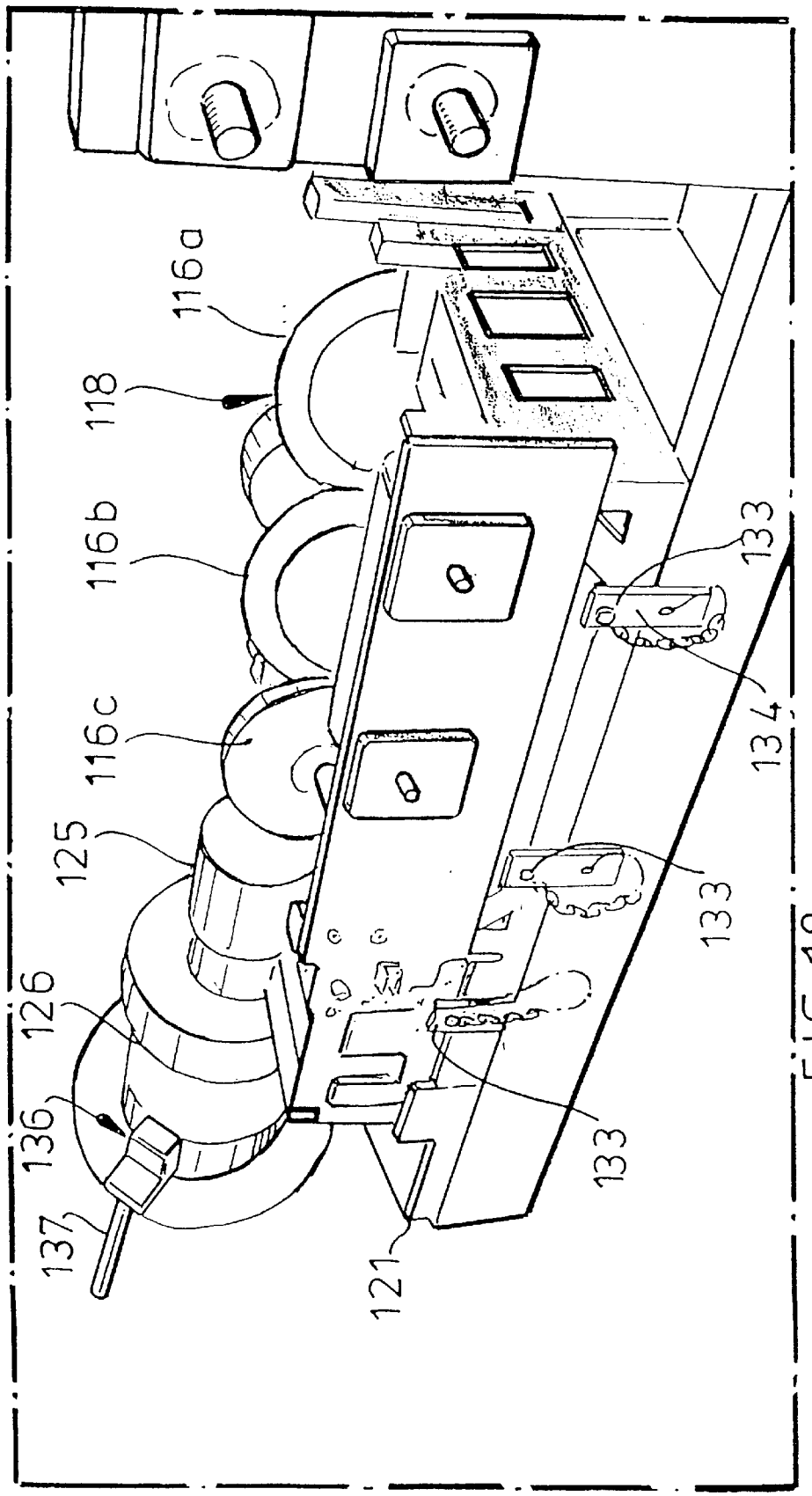

From FIGS. 14 and 15 it will be seen that the support frame 112 differs from the support frame 12 described above in that it also supports a pair of guide rollers 130, 131 mounted horizontally one above the other between support arms 140 to direct the liner to the deforming apparatus 110. The bottom guide roller 130 is profiled so that a rectangular slot is defined between the two rollers 130, 131 to receive the liner in the semi-layflat configuration in which it is fed into the excavation. This pair of rollers 130, 131 serve to re-direct the liner towards the deforming means 110 and also to prevent the liner from twisting before it enters the deforming means 110 so that it is orientated correctly.

The lower part 111 of the deforming apparatus 110 is located in position on the support frame 112 by the use of locating pins 133 which are received within holes provided in mounting flanges 134 which are provided on the frame 112. The top part 119 is secured to the bottom part 118 by bolts 120 which are tightened to bring the two parts together and deform the liner in the manner described above.

Turning now to the modified binding apparatus 11 (shown in FIGS. 14, 20 and 21), this comprises a support frame 121 (which is mounted on the support base 112 and located with respect to the support base 112 and the defining apparatus 110 by means of locating pins 133), a horizontal steel tube 123, fitted with a internally tapered plastics end piece 125, a plastics bearing 126 supporting a bobbin 127 and a planetary bar 137 which is secured to the bearing 126 by a mounting flange 136 such that it extends forward of the bearing 126 to the front edge of the tube 123 parallel with its axis (the planetary guide bar 137 corresponds to the planetary roller 37 described above). These components function in the same way as the, corresponding components described above, but the modified binding apparatus comprises different drive means from that described above.

Rotation of the bearing 126 (and thus bobbin 127 and planetary guide bar 137) is by way of a gear wheel (not shown) housed within casing 135 driven by a shaft which feeds from a gear mechanism (not shown) housed within casing 136 which is in turn driven by rotation of wheels 116a and 166b. The gear mechanism 136 is directly connected only to the shaft of wheel 116b but drive is taken from both wheels 116a and 116b because they are interconnected by a chain drive 137 as can be seen from FIG. 17. Thus, in use, as the liner is drawn through the apparatus and is compressed between the deforming wheels and the upper horizontal rollers 115, the deforming wheels rotate at a rate directly proportional to the rate of passage of the liner through the apparatus, and thus the bobbin 127 and planetary bar 137 similarly rotate at a rate synchronised to the rate of travel of the liner. The wheels are fitted with circumferential rubber treads to increase friction with the liner and reduce the likelihood of slipping.

The bar 137 is used in place of the roller 137 as in some circumstances the roller 137 may not allow the tape to slide along the length of the roller which is required to maintain a consistent feed to the liner. Provision of the bar, which is preferably has a smooth matt surface to prevent the tape "sticking" on the bar, ensures that the tape effectively travels along the length of the bar from the point at which it is received from the bobbin 127 to the point at which it is fed to the liner. The bar is preferably angled slightly away from the axis of the liner to prevent the tape from "creeping" along the length of the bar and slipping from the bar altogether.

With the apparatus described In relation to FIGS. 1 to 13, because the fold is formed in the "top" of the liner, should the liner not perfectly recover its circular cross-section when expanded after installation in the pipe (for instance at locations where the pipe diameter is undersized), any deviation from the circular cross-section will be adjacent the top of the pipe which is typically the area of the pipe at which ferrules etc. are connected. In contrast, with the modified apparatus described in relation of FIGS. 14 to 21, any irregularities In the shape of the expanded liner will face the bottom of the pipe which will not generally contain ferrule or other connections. Thus, even if the pipe liner is slightly over-sized relative to the internal dimensions of the pipe in which it is installed, such that it does not completely recover a circular cross-section, the expanded liner should nevertheless lay flat against the upper portions of the pipe and against any ferrule connections. Thus, the modified apparatus allows for a greater tolerance in relative sizes of the liner and pipes in to which liner is to be installed, so that, for instance, a liner of a given outside dimension may be suitable for use with a range of pipe diameter and thus fewer liner sizes are required.

As a modification to the basic liner installation method described above, a thin plastics pre-liner may be installed in the pipe before installation of the main liner. It has been found that by installing such a pre-liner, for instance fabricated from polyethylene (e.g. 500s gauge) effectively "lubricates" installation of the main liner. This both prevents any damage to the binding through scuffing against the interior of the pipe wall, and also allows winching loads to be reduced. The pre-liner can be inserted using any suitable technique, for instance by a well established eversion method using compressed air. In this way, a thin polythene pre-liner can be installed in a pipe at a rate of approximately 50 meters per minute so that installation of the pre-liner is a quick and easy preliminary step to installation of the main liner in accordance with the above method. Because the pre-liner is very thin, it can be left in place with the pipe trapped between the main liner and the pipe wall.

Such a pre-lining method could also be used as a preliminary stop to conventional pipe lining methods.

All other aspects of the liner installation may be the same as described above in relation to FIGS. 1 to 10.

What is claimed is:

1. A method for lining a conduit with a deformable plastics liner pipe, the method comprising;
   (i) deforming the liner along its length to a cross-section with reduced external dimensions relative to the dimensions of the un-deformed liner,
   (ii) binding the liner by helically winding an elongate flexible element around the liner along its length to maintain it in said deformed cross-section;
   (iii) drawing the bound liner into the conduit to be lined;
   (iv) releasing the binding to allow the liner to assume a cross-section substantially corresponding with the internal cross-section of the conduit;
   wherein the elongate flexible element is supplied to the liner from a bobbin or the like through which the liner is passed in said deformed cross-section, the bobbin or the like being mounted for rotation around the liner as it passes therethrough to wind the elongate flexible element around the liner.

2. A method according to claim 1, wherein the flexible element is passed from the bobbin or the like to the liner via a roller or other guide which is rotated in a planetary manner around the liner to wind the elongate flexible element around the liner.

3. A method according to claim 2, wherein rotation of said roller or guide is synchronized with the speed of travel of the liner via a synchronous drive mechanism.

4. A method according to claim 3, wherein the liner is mechanically deformed by means comprising at least one pair of rollers disposed on opposite sides of the liner and a mechanical former which comprises wheels mounted for rotation at substantially 90° to the or each pair of rollers, the former depressing the liner into a generally U-shaped cross-section between said rollers, wherein said synchronous drive is driven by rotation of said rollers or said wheels which are rotated through frictional contact with the liner as the liner passes thereby.

5. A method for lining a conduit according to claim 1, wherein the liner is passed through a restraining member subsequent to its deformation to temporarily maintain the liner in said deformed cross-section as it passes therethrough, and wherein the bobbin or the like is mounted generally co-axially with the restraining member for rotation around the restraining member as the liner travels therethrough, such that the flexible element is wound around the liner as it exists the restraining member.

6. A method according to claim 5, wherein the restraining member comprises a tube having an internal diameter corresponding to the outside diameter of the deformed liner.

7. A method according to claim 1, wherein the plane of the bobbin or the like lies at an angle to the axis of the restraining member.

8. A method according to claim 1, wherein the elongate flexible element is a self adhesive tape.

9. A method according to claim 1, wherein the liner is fabricated from a plastics material and has a wall thickness in the range of about 1.5 mm to 5 mm.

10. A method according to claim 1, wherein a cable is drawn into the pipe together with the liner, between the liner and the binding, and once the liner has been fully drawn into the conduit a cutting means is attached to the end of the cable which is then withdrawn from the pipe such that the cutting means passes along the length of the pipe/liner and cuts through the binding thereby releasing the liner.

11. A method according to claim 1, wherein the binding is released by pressuring gas or liquid within the liner to expand the liner and break the binding.

12. A method according to claim 1, wherein gas or liquid is pressurized within the liner to expand the liner from the deformed cross-section to said cross-section corresponding with the cross-section of the conduit.

13. A method according to claim 1, wherein as a preliminary step a thin plastics pre-liner is first installed in the conduit prior to insertion of said deformable plastics liner.

14. A method according to claim 13, wherein the thin pre-liner is fabricated from polyethylene of thickness of the order of 500s gauge.

15. A method according to claim 13, wherein said thin pre-liner is installed in the conduit by a process of eversion using pressurized fluid such as air or water.

16. A method for lining a conduit with a deformable plastics liner pipe, the method comprising:

(i) deforming the liner along its length to a cross-section with reduced external dimensions relative to the dimensions of the un-deformed liner;

(ii) binding the liner by helically winding an elongate flexible element around the liner along its length to maintain it in said deformed cross-section;

(iii) drawing the bound liner into the conduit to be lined;

(iv) releasing the binding to allow the liner to assume a cross-section substantially corresponding with the internal cross-section of the conduit;

wherein the elongate flexible element is a self-adhesive tape.

* * * * *